United States Patent [19]
Setbacken et al.

[11] Patent Number: 5,936,236
[45] Date of Patent: Aug. 10, 1999

[54] METHOD FOR GENERATING A SYNTHETIC REFERENCE SIGNAL FOR COMPARISON WITH SCANNING SIGNALS OF A POSITION MEASURING DEVICE

[75] Inventors: Robert Setbacken, Santa Barbara, Calif.; Donald E. Barnett, West Chester, Pa.

[73] Assignee: Renco Encoders, Inc., Goleta, Calif.

[21] Appl. No.: 08/980,047

[22] Filed: Nov. 26, 1997

[51] Int. Cl.$^6$ .................................................. G01D 5/34
[52] U.S. Cl. ................................ 250/231.13; 250/231.16
[58] Field of Search ........................ 250/231.13, 231.15, 250/231.16, 237 G, 214 R; 356/373, 374; 341/13

[56] References Cited

U.S. PATENT DOCUMENTS

| | | |
|---|---|---|
| 3,801,830 | 4/1974 | Boyer . |
| 3,809,895 | 5/1974 | Taisne ................................ 250/237 G |
| 5,347,355 | 9/1994 | Eguchi ............................... 250/231.16 |
| 5,483,059 | 1/1996 | Igaki et al. ......................... 250/231.16 |

*Primary Examiner*—Que T. Le
*Attorney, Agent, or Firm*—Brinks, Hofer, Gilson & Lione

[57] ABSTRACT

A method and device for generating a reference signal for comparison with scanning signals generated by a position measuring device. The reference signal is generated using the same components used to scan a scale by averaging the scanning signals so that the reference signal is always less than the higher state of any scanning signal.

14 Claims, 4 Drawing Sheets

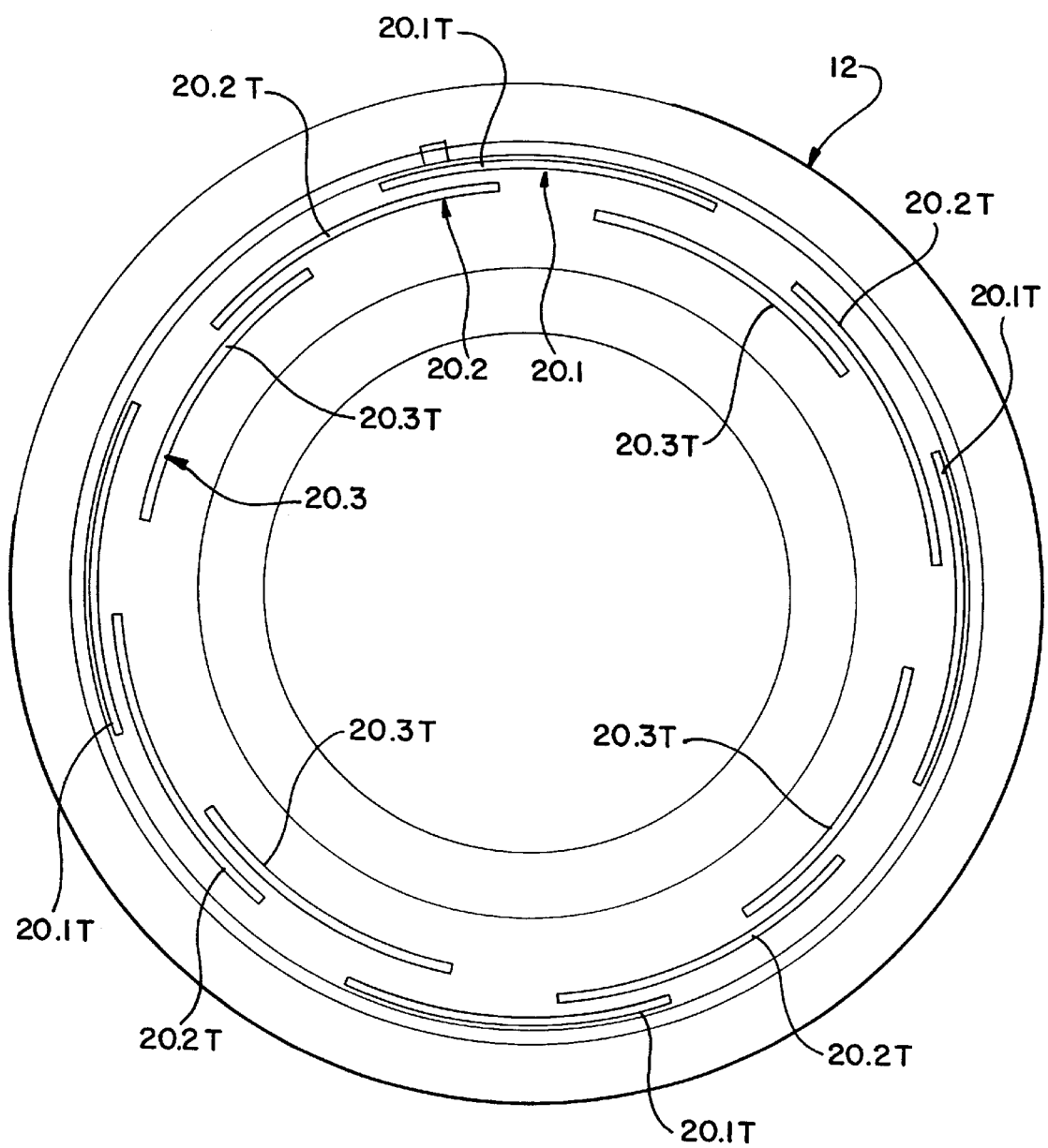

INPUT / OUTPUT $SI_{A,D}$ $S2_{A,D}$ $S3_{A,D}$

NODE $V_A$ $V_B$ $V_C$ $V_D$

5,936,236

METHOD FOR GENERATING A SYNTHETIC REFERENCE SIGNAL FOR COMPARISON WITH SCANNING SIGNALS OF A POSITION MEASURING DEVICE

FIELD OF THE INVENTION

The present invention is directed to a method for generating a synthetic reference voltage for comparison with scanning signals of a position measuring device. This method is uniquely suited for the generation of three-phase control signals for commutation of brushless motors using optical sensors.

BACKGROUND OF THE INVENTION

Comparators have been used particularly in position measuring devices to detect when the outputs of a scanning unit, i.e. scanning signals, are in a relatively high state so that digital outputs can be correctly represented. Typically the inputs to the comparators have been generated in one of three ways. One way is to provide as an input to the comparators a fixed voltage as the reference signal and provide the scanning signals to the other input of the comparators. The reference voltage has a value that is selected to be at the midpoint of the photodetector voltage swing. By setting the reference voltage at this midpoint the comparators can detect whether the scanning signals are at a relatively high state or low state compared to the reference voltage. For example, when the scanning signal is connected to the positive input of the comparator and the reference voltage is connected to the negative input, the output signal will be high when the scanning signal is higher than the reference voltage. When the input signal is comparatively lower than the reference voltage, the output signal will be low.

Typically a scanning unit will have a plurality of scanning elements, for example three, that produce a plurality of scanning signals. A disadvantage of setting the reference voltage at a midpoint is that it may be difficult to find a reference voltage that works for all scanning elements due to uneven illumination by a light source. This can result in excessive labor at the time of manufacture as the proper value must be determined, and the appropriate circuit adjustments made. In addition, this reference voltage will be fixed, and so will not accommodate scanning signal degradation, which can occur as the light source ages or when the operating environmental temperature varies. As illumination degrades, the scanning signals which are output from the photodetectors will diminish, and there may come a time when one or more no longer exceeds the reference voltage. At this point the comparator circuit ceases to function properly.

An improved method is to replace the fixed reference voltage with a reference voltage generated by an additional optical element. This element is always illuminated, and so it will provide a constant voltage which can be used as a reference voltage to the comparator. Although this approach allows for variations in illumination due to environmental temperature change or the age of the light source, it is more expensive and consumes more surface area because of the need for an additional element and requires a larger area of illumination from the light source. In addition, cross-talk from adjacent tracks on the code disk can produce fluctuations in the reference signal which can cause false triggering of the comparator.

A third method uses two optical sensors, one of which will always be off when the other is on. By using these as inputs to a comparator, a clean switching signal can be developed at the output. This signal is very robust due to the large signal difference developed by the complimentary optical signals. This approach allows for light degradation, and is relatively insensitive to modest levels of crosstalk. A disadvantage is that now two sensors are required to generate each output signal which increases manufacturing costs. This approach also requires an even larger illuminated area and associated space on the code disk. This can be a severe disadvantage as it is desirable to make encoder dimensions smaller.

It is thus desirable to provide a position measuring device that provides a reference signal which is compared to the scanning signals that allow for light degradation, that is relatively insensitive to cross talk and does not require an additional sensor or an enlarged illuminated area and associated space on the code disk.

SUMMARY OF THE INVENTION

According to a first aspect of the invention there is provided a measuring device having a scale with at least three graduation tracks. A scanning unit having three sensors for scanning the three graduation tracks is also provided. The scale is displaceable relative to the scanning unit and the sensors generate scanning signals which have either a high or low state. Comparator units are coupled to the sensors and generate digital signals from the scanning signals. Each of the three comparator units has a first and second input. The first input is coupled to a sensor and the second input receives a reference signal that is a combination of the output of each of the three sensors. The reference is always less than the higher state of any scanning signal.

According to a second aspect of the invention there is provided a method for measuring the displacement of a scale relative to a scanning unit wherein the scale has at least three one graduation tracks. The method includes the steps of generating three scanning signals by scanning the three graduation track, with three sensors; generating a reference signal by averaging the three scanning signals; and comparing the reference signal with each scanning signal.

According to a third aspect of the invention there is provided a measuring device comprising a scanning unit having sensors for scanning at least three graduation tracks of a scale which is displaceable with respect to the scanning unit wherein the sensors each output a scanning signal. The device includes means for generating a reference signal that is a combination of the scanning signals; and means for comparing the scanning signals with the reference signal.

According to a fourth aspect of the invention there is provided a method for measuring the displacement of a scale relative to a scanning unit wherein the scale has at least three graduation tracks. The method includes the steps of generating a reference signal that is a combination of a plurality of scanning signals; and comparing the reference signal with each scanning signal.

BRIEF DESCRIPTION OF THE DRAWINGS

FIG. 3 illustrates the graduation on the scale.

DETAILED DESCRIPTION OF THE PRESENTLY PREFERRED EMBODIMENTS

Figure 1:
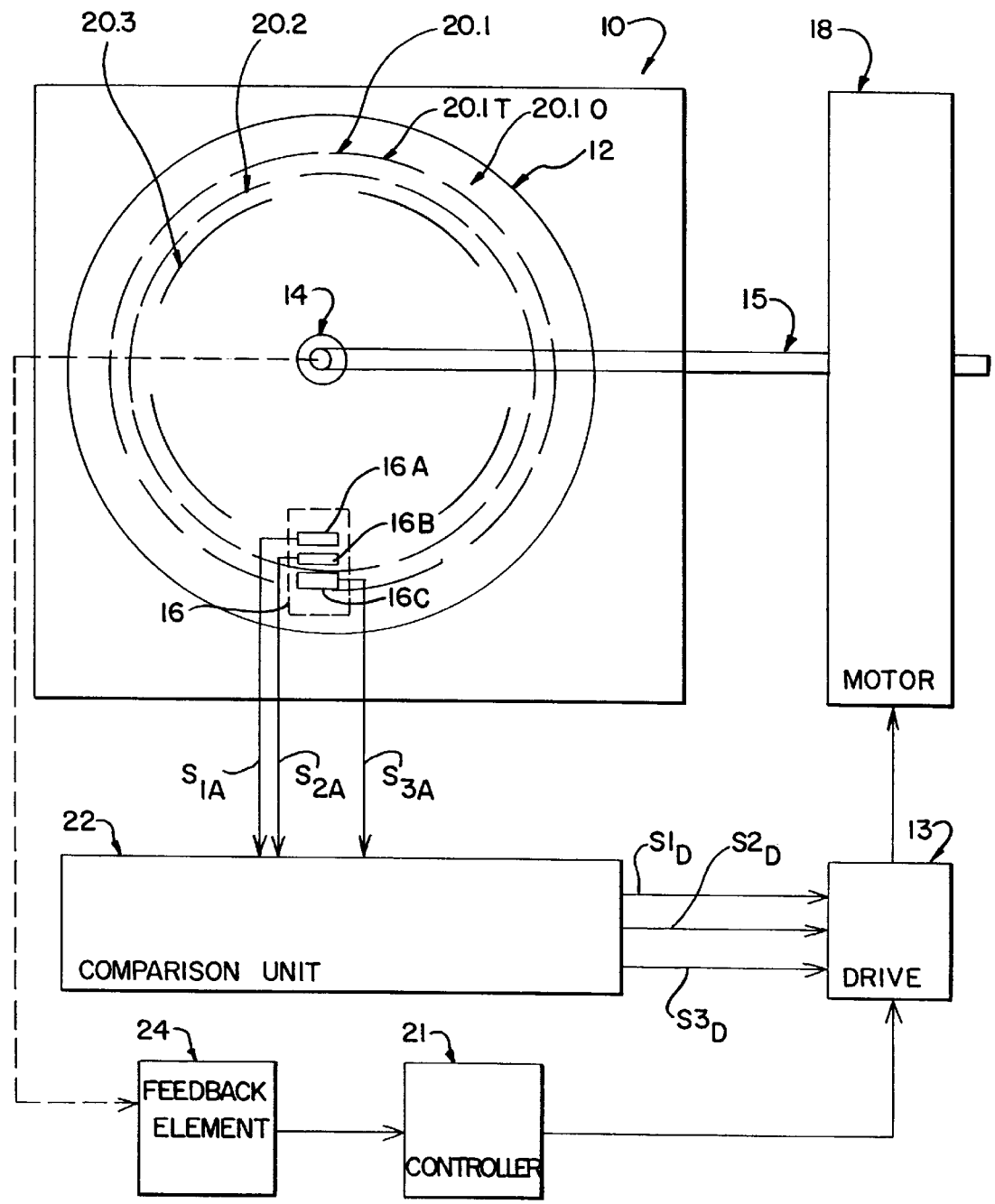
FIG. 1 is a schematic of a position measuring device coupled to a motor according to a preferred embodiment of the present invention.

FIG. 1 is a schematic of a position measuring device coupled to a motor according to a preferred embodiment of the present invention. In a preferred embodiment the position measuring device is in the form of an angle encoder 10 that includes a scale 12, a hub 14 and a scanning unit 16. The hub 14 is preferably coupled to motor a shaft 15 so as the motor 18 rotates, so does the scale 12. The encoder is preferably used to encode the commutation of the motor. It can be seen that the embodiment described is appropriate for rotary motion systems, however, similar components can be used for linear motion systems. The scale 12 preferably has three graduation tracks 20.1, 20.2, 20.3 disposed thereon which are concentrically arranged with a first track 20.1 located furthest from the hub 14 and a third track 20.3 located closest to the hub 14. A second track 20.2 is located between the first and third tracks. In a preferred embodiment the angle encoder is an optical encoder and graduation tracks 20.1, 20.2, 20.3 are formed by opaque and light transmissive areas sequentially arranged as is well known to those of ordinary skill in the art. In FIG. 1 the light transmissive areas are indicated by the dark lines and the opaque areas are located between adjacent light transmissive areas. The scanning unit 16 includes a plurality of scanning elements (16a, 16b, 16c), preferably three, that scan the graduation track 20.1, 20.2, 20.3, respectively.

In a preferred embodiment, for example as might be used in an eight-pole brushless motor, each graduation or commutation track, for example track 20.1, includes four transmissive areas 20.1t and four opaque areas 20.1o. Accordingly, each transmissive and opaque area covers an angular range of 45°. The three graduation tracks 20.1, 20.2, 20.3 are shifted with respect to one another by 15° so that six unique signal states each covering 15° within an angular range of 90° as will be described with reference to Table 1 will be generated. Within the angular range of 90° it is possible to determine an exact position with an accuracy of 15° by evaluating the scanning signals $S1_A$, $S2_A$, $S3_A$ output by scanning elements 16a, 16b, 16c respectively. While a preferred embodiment shows the angle encoder in the form of an optical encoder it may alternatively be a magnetic encoder as well which uses magnetic sensors for scanning a magnetic graduation. Of course similar graduation patterns can be used for four-pole, six-pole or any other motor configuration.

The scanning unit 16 outputs three analog scanning signals $S1_A$, $S2_A$, $S3_A$. These analog signals need to be converted to digital signals so that they can be processed by other electronics located downstream of the scanning unit 16 which do not form part of the present invention. The analog scanning signals are input to a comparison unit 22 where they are converted to digital signals as will be described in detail with reference to FIG. 2. For commutation signals each of the scanning signals will be converted into a digital signal that can be synchronized with the relative position of the motor's windings as is well known by those of ordinary skill in the art. As is also well known by those of ordinary skill in the art, the outputs of the comparison unit 22 are sent to the motor 18 through a drive circuit 13. Position commands are generated by a controller 21 which acts upon measurements made by a feedback device 24 as is well known to those of ordinary skill in the art.

Figure 2:
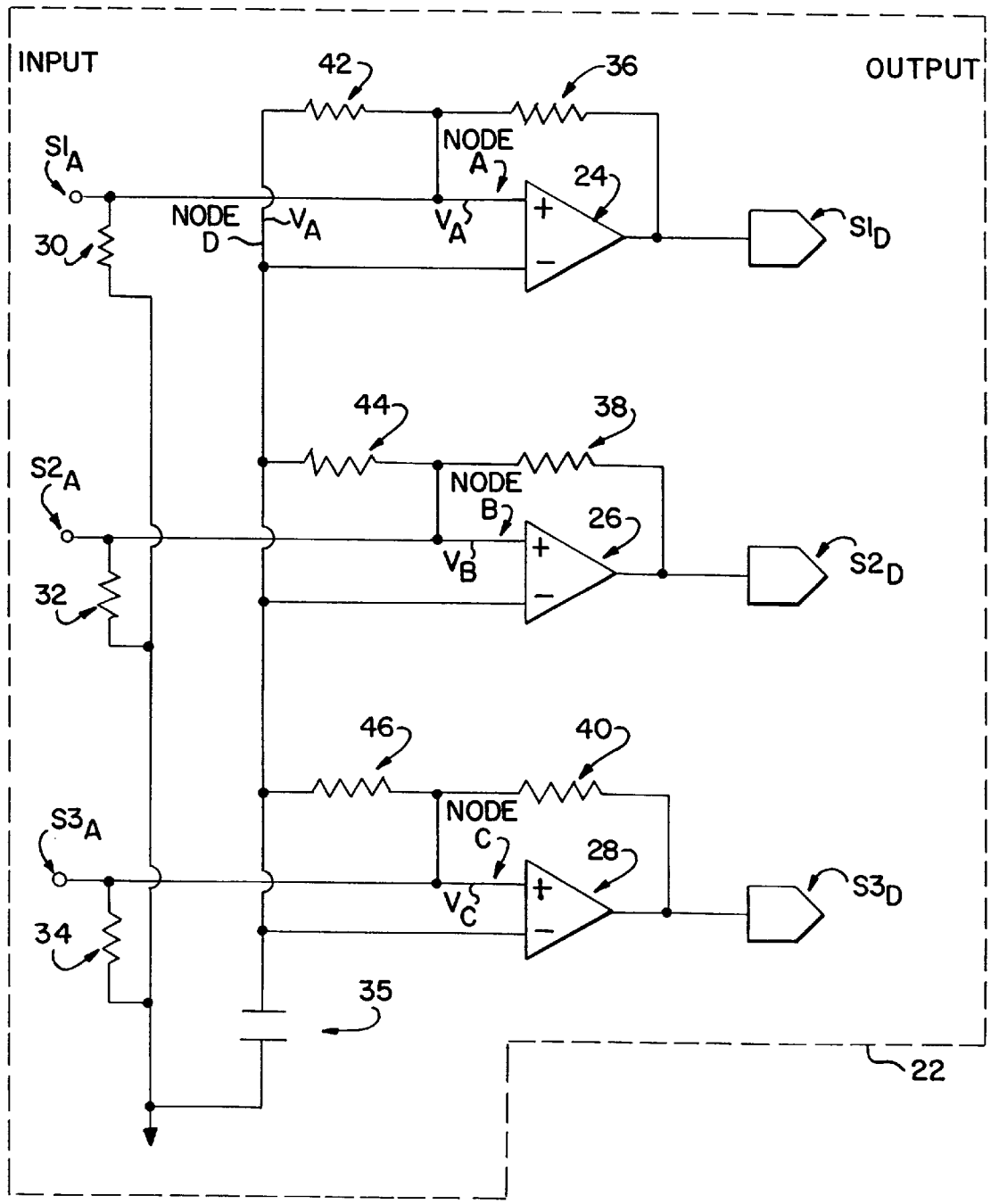
FIG. 2 is a schematic of the circuitry of the comparison unit 22 shown in FIG. 1.

FIG. 2 is a schematic of the circuitry of the comparison unit shown in FIG. 1. The comparison unit 22 includes three comparators 24, 26 and 28. The positive terminal of comparator 24, node A, is coupled to scanning signal $S1_A$, the positive terminal of comparator 26, node B, is coupled to scanning signal $S2_A$, and the positive terminal of comparator 28, node C, is coupled to scanning signal $S3_A$. The scanning signal levels are controlled by the values selected for resistors 30, 32, 34 and are chosen based upon the desired output level, and sensor characteristics. A typical value might be about 800 Ω when photo-transistors are used. The negative terminals of comparator 24, 26, 28 are tied together at node D, and are coupled to the scanning signals $S1_A$, $S2_A$, $S3_A$ through resistors 42, 44, 46 as shown. In a preferred embodiment a capacitor 35 is also included but is not necessary. Comparator 24 outputs a digital signal $S1_D$ representative of scanning signal $S1_A$. Comparator 26 outputs a digital signal $S2_D$ representative of scanning signal $S2_A$. Comparator 28 outputs a digital signal $S3_D$ representative of scanning signal $S3_A$. The output of the comparators 24, 26, 28 are also fed back to their respective positive input through feed back resistors 36, 38 and 40 respectively. The output of the comparators 24, 26, 28 are also fed back to their negative input through feed back resistors 36, 38 and 40 and reference resistors 42, 44, 46 respectively.

The reference voltage for each comparator is generated through its respective reference resistor 42, 44 or 46 connected in its feedback path. The reference voltage at node D is an average of the three signal voltages at nodes A, B, and C. Feedback resistors 36, 38, 40 are hysteresis feedback resistors that prevent oscillations about the comparator input transition points. The capacitor 35 is optional and is present in the circuit to reduce noise and overshoots on the voltage transitions at node D. The value of the reference resistors 42, 44, 46 is about 20 times greater than the value of the load resistors 30, 32, 34 and thus has little effect on the voltages at nodes A, B and C.

Equation 1 below approximates the voltage at node D, i.e., $V_D$ is:

$$V_D = (V_A + V_B + V_C)/3, \quad \text{(Equation 1)}$$

where $V_A$ is the voltage at node A, $V_B$ is the voltage at node B, $V_C$ is the voltage at node C and $V_D$ is the voltage at node D.

In a preferred embodiment there are three scanning signals that each can be in either one of two states, i.e., a high or low state. The graduation 20 on the disk is patterned to provide the following six unique signal states as shown in Table 1:

TABLE 1

| | |
|---|---|
| 1. | $A_{high}$, $B_{low}$, $C_{high}$ |
| 2. | $A_{high}$, $B_{low}$, $C_{low}$ |
| 3. | $A_{high}$, $B_{high}$, $C_{low}$ |
| 4. | $A_{low}$, $B_{high}$, $C_{low}$ |
| 5. | $A_{low}$, $B_{high}$, $C_{high}$ |
| 6. | $A_{low}$, $B_{low}$, $C_{high}$ |

Because of this unique arrangement of graduation tracks 20.1, 20.2, 20.3, the reference signal is always less than the higher state of any of the scanning signals $S1_A$, $S2_A$, $S3_A$. Thus, two of the three scanning signals are always in either a low state or a high state as can be seen from Table 1. By averaging the three scanning signals, a reference signal is generated that is always less than any one of the scanning signals itself.

FIG. 3 illustrates the graduation 20 on the scale 12. The signals required to commutate a brushless motor resulting from the graduation 20 and the three sensors will be described with reference to FIG. 4. There is no condition where all three signals are in the same state.

The voltage at node D, ($V_D$) experiences only two unique states: (1) if the signal levels are two highs and a low at nodes A, B, C; $V_D$ is an average ⅔ signal; or (2) if the signal levels are two lows and a high at nodes A, B, C; $V_D$ is an average ⅓ signal.

The voltage at node D ($V_D$), is used to provide a comparison reference voltage for nodes A, B and C. If the voltage at node A, B or C is higher than the voltage at node D, a high output signal will be output from the respective comparator shown in FIG. 2. If the voltage at node A, B or C is less than the voltage at node D, a low output signal will be output from the respective comparator. As long as the signal voltages at nodes A, B, and C are similar, the true value of the input signal is given in the output signal. In the case of brushless motor commutation, when the state relationships between nodes A, B and C are as defined by Table 1, the voltages associated with a high and a low value can vary substantially between the three signals and still yield a valid reference signal. For example, if a low level signal is represented by 0.25 volts and a high level signal between 0.45 and 0.60 volts, then the reference value provided in the circuit of FIG. 2 at node D will function correctly. Variations in the high level signal of as much as 25% can be tolerated. In the manufacture of optical encoder products, it is usually a simple matter to achieve outputs with this level of consistency without adjustment or tuning.

The present invention does not require additional optical components to generate the reference voltage $V_D$ because the same scanning elements are used to generate the reference voltage and the scanning signals. Because the same scanning elements are used, the aging of the illumination source and environmental temperature changes affect both the reference signal and the scanning signals equally. Since no additional components are required, the illuminated area on the scale and the dimensions of the scale are minimized. Also, fine adjustments during the manufacture of the device are not needed thereby expediting the manufacture reducing production costs.

In a preferred embodiment, the circuit components shown in FIG. 2 have the following values:

| component | value |
| --- | --- |
| resistors 30, 32, 34 | about 800 Ω |
| resistors 42, 44, 46 | about 10 k Ω |
| resistors 36, 38, 40 | about 200 k Ω |
| capacitor 35 | about 0.1 μfd |

Figure 4A:
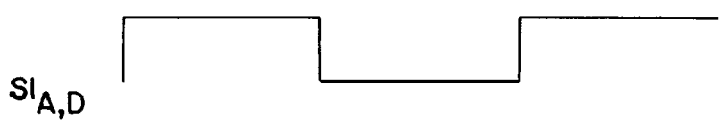
FIGS. 4a–g are diagrams of the signal waveforms present in the comparison unit shown in FIG. 2.
Figure 4B:
Figure 4C:
Figure 4D:
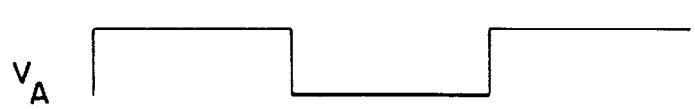
Figure 4E:
Figure 4F:
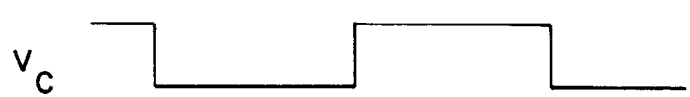
Figure 4G:
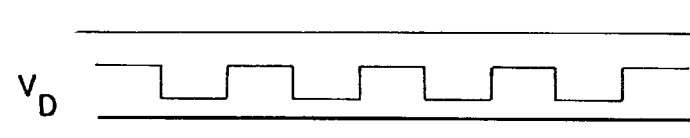

FIGS. 4*a–g* are diagrams of the signal waveforms present in the comparison unit shown in FIG. 2. FIGS. 4*a–c* illustrate both the input signals S1$_A$, S2$_A$, S3$_A$, and output signals S1$_D$, S2$_D$, S3$_D$ respectively. FIGS. 4*d–f* illustrate the signal voltages at nodes A, B and C, i.e. $V_A$, $V_B$ $V_C$ respectively. FIG. 4*g* illustrates the reference voltage at the node D, $V_D$, which is derived from the voltages at nodes A, B and C.

While this invention has been shown and described in connection with the preferred embodiments, it is apparent that certain changes and modifications, in addition to those mentioned above, may be made from the basic features of the present invention. Accordingly, it is the intention of the Applicants to protect all variations and modifications within the true spirit and valid scope of the present invention.

What is claimed is:

1. A measuring device comprising:

a scale with at least three graduation tracks;

a scanning unit having three sensors for scanning graduation tracks wherein the scale is displaceable relative to the scanning unit, the sensors generating scanning signals which have either a high or low state;

three comparator units coupled to the sensors wherein the comparator units generate digital signals from the scanning signals wherein each of the three comparator units has a first and a second input wherein the first input is coupled to a sensor and the second input receives a reference signal that is a combination of the output of each of the three sensors wherein the reference signal is always less than the higher state of any scanning signal.

2. A measuring device according to claim 1 wherein the sensors are optical sensors.

3. A measuring device according to claim 1 wherein the sensors are magnetic sensors.

4. A measuring device according to claim 1 wherein each graduation track comprises four opaque and four transparent areas sequentially disposed on the scale wherein each opaque and transport area covers an angular range of 45°.

5. A measuring device according to claim 4 wherein each graduation track is shifted with respect to an adjacent track by 15°.

6. A measuring device according to claim 1 wherein each of the three comparator units is an amplifier.

7. A measuring device according to claim 1 wherein the reference signal is an average of the output of the three sensors.

8. A method for measuring the displacement of a scale relative to a scanning unit wherein the scale has at least three graduation tracks, the method comprising the steps of:

generating three scanning signals by scanning the three graduation tracks with three sensors wherein only two of the three scanning signals are in a same state;

generating a reference signal by averaging the three scanning signals wherein the reference signal is less than any one of the three scanning signals; and comparing the reference signal with each scanning signal.

9. A method according to claim 7 further comprising the steps of generating a high state signal if the scanning signal is greater than the reference signal and generating a low state signal if the scanning signal is less than the reference signal.

10. A measuring device comprising a scanning unit and a scale having at least three graduation tracks which is displaceable with respect to the scanning unit, the device comprising;

means for generating three scanning signals by scanning the three graduation tracks with three sensors wherein only two of the three scanning signals are in a same state;

means for generating a reference signal that is a combination of the scanning signals wherein the reference signal is less than any one of the three scanning signals; and means for comparing the scanning signals with the reference signal.

11. A measuring device according to claim 9 wherein the means for comparing is a comparator.

12. A measuring device according to claim 9 wherein the reference signal is an average of the scanning signals.

13. A method for measuring the displacement of a scale relative to a scanning unit, wherein the scale has at least three graduation tracks, the method comprising the steps of:

generating three scanning signals by scanning the three graduation tracks with three sensors wherein only two of the three scanning signals are in a same state;

generating a reference signal that is a combination of a plurality of scanning signals wherein the reference signal is less than any one of the three scanning signals; and comparing the reference signal with each scanning signal.

14. A method according to claim 13 further comprising the steps of generating a high state signal if the scanning signal is greater than the reference signal and generating a low state signal if the scanning signal is less than the reference signal.

* * * * *

UNITED STATES PATENT AND TRADEMARK OFFICE
CERTIFICATE OF CORRECTION

PATENT NO.   : 5,936,236
DATED        : August 10, 1999
INVENTOR(S)  : R. Setbacken et al.

It is certified that error appears in the above-identified patent and that said Letters Patent is hereby corrected as shown below:

In the Claims

In claim 4, line 4, delete "transport" and substitute --transparent-- in its place.

Signed and Sealed this

Seventeenth Day of April, 2001

Attest:

NICHOLAS P. GODICI

Attesting Officer    Acting Director of the United States Patent and Trademark Office